O. C. WHITE.
EGG GRADER.
APPLICATION FILED DEC. 14, 1916.
1,259,181. Patented Mar. 12, 1918.
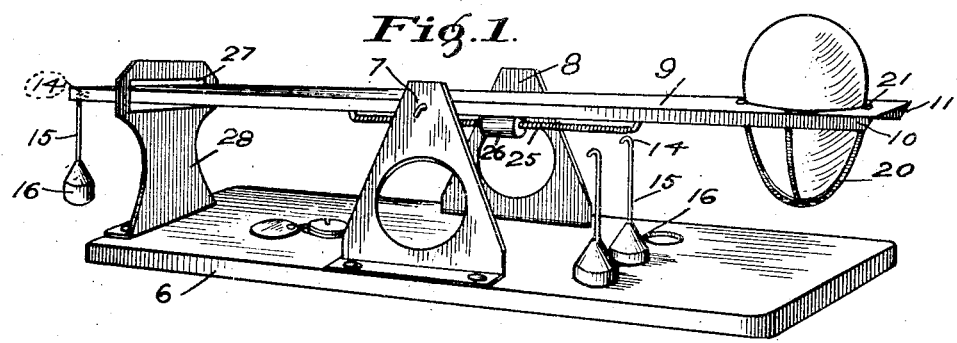
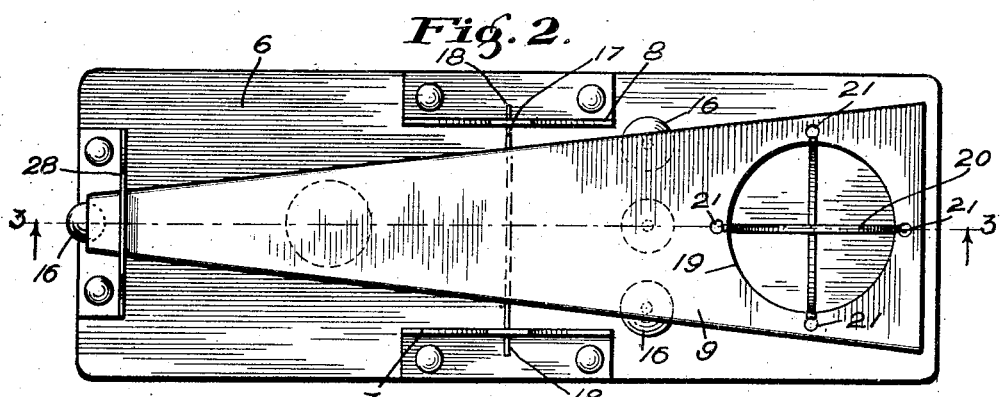
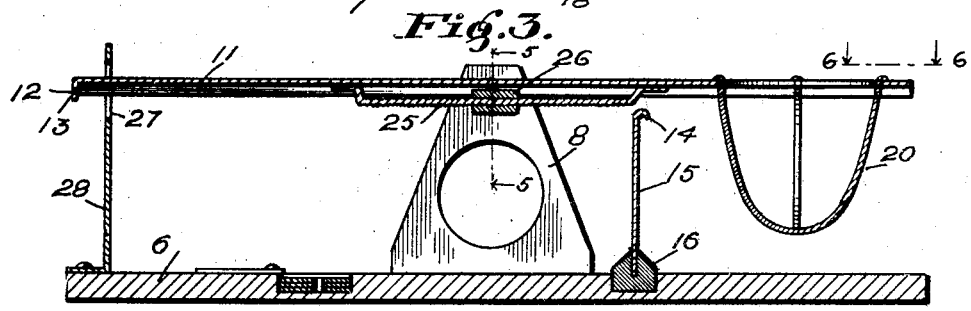
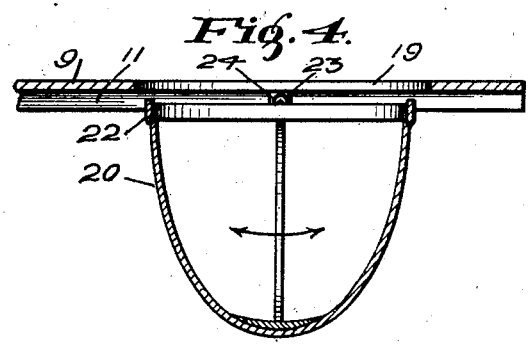
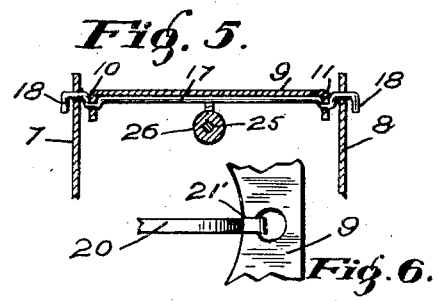
INVENTOR
Oliver C. White
by Hazard & Miller
ATTYS.

UNITED STATES PATENT OFFICE.

OLIVER C. WHITE, OF GARDENA, CALIFORNIA.

EGG-GRADER.

1,259,181.	Specification of Letters Patent.	Patented Mar. 12, 1918.

Application filed December 14, 1916. Serial No. 136,997.

*To all whom it may concern:*

Be it known that I, OLIVER C. WHITE, a citizen of the United States, residing at Gardena, in the county of Los Angeles and State of California, have invented new and useful Improvements in Egg-Graders, of which the following is a specification.

This invention relates to an egg grader.

It is the object of this invention to provide a device by means of which eggs may be graded according to their weight and to meet the requirements of egg dealers and producers in classifying eggs as "pullets", "standard", and "select", and which is especially adapted for use as a check by egg packers who depend upon the sense of weight in determining the class in which the egg belongs.

Another object is to provide a grader of the above character which is simple in construction and easily and quickly operated.

Other objects will appear hereinafter.

The invention is illustrated, by way of example, in the accompanying drawings in which:

Figure 1 is a view in perspective of the egg grader.

Fig. 2 is a plan view of same.

Fig. 3 is a view in section and elevation as seen on the line 3—3 of Fig. 2 in the direction indicated by the arrows.

Fig. 4 is a detail section and elevation illustrating a modified form of the egg suspending basket.

Fig. 5 is a detail section on the line 5—5 of Fig. 3 illustrating the manner of forming a pivotal support.

Fig. 6 is an enlarged detail in plan as seen on the line 6—6 of Fig. 3.

Referring to the drawings more particularly, 6 indicates a base which may be of any suitable construction and carrying a pair of standards 7 and 8 on which a balance-beam 9 is pivotally mounted. The beam 9 is formed of sheet metal and has down-turned side flanges 10 and 11 and a down-turned end flange 12. The end flange 12 is formed with a perforation 13 adapted to receive a hook 14 on the stem 15 formed on a weight 16. The pivotal mounting of the beam 9 consists of a wire 17 which extends transversely across the under side of the beam and is bent downwardly to pass through perforations in the flanges 10 and 11. The end portions of the wire are then bent upwardly and outwardly to form pivot pins 18 which pass through perforations in the standards 7 and 8. The wire 17 is soldered or otherwise secured to the under side of the beam and has its outer ends bent downwardly adjacent the outer faces of the standards so as to hold the beam against accidental disengagement from the standards. The beam 9 is formed with a circular opening 19 adjacent the end opposite the flanged end, which opening is a trifle larger than the transverse diameter of a large-sized egg, or approximately of a corresponding diameter. Depending beneath the opening 19 is a basket or receptacle 20 which is shown in Figs. 1, 2 and 3 as formed of a pair of U-shaped wires arranged crosswise to each other and soldered together midway of their ends, and the terminals of which are hooked over the marginal edges of the opening and through perforations 21 formed in the beam. It is essential that the marginal edge of the opening be smooth so as not to present projections which might damage the egg positioned therein. It is therefore formed with notches 21' opposite the perforations 21 into which the wires of the basket are arranged, as shown in Fig. 6, so that the outer faces of the wires will extend flush with the edge of the opening.

In some instances it may be desirable to pivotally suspend the basket 20, in which event the U-shaped wires are connected to a ring 22, as shown in Fig. 4, which ring is fitted with trunnions 23 adapted to be suspended from lugs 24 projecting downwardly from the marginal edges of the perforation 19 on diametrically opposite sides thereof. The trunnions 23 are arranged parallel with the pivot pins of the bar 9 so that the basket 20 will swing only at right angles to the pivotal mounting of the beam.

Mounted on the under side of the beam and extending longitudinally thereof is a threaded rod 25 on which a balancing sleeve 26 is mounted for adjustment, and which sleeve is set so that the beam will normally be disposed in a horizontal position. The outer or flanged end of the beam projects through a slot 27 formed in a standard 28 projecting upwardly from the base 6. When the beam 9 is properly balanced its outer end will be positioned intermediate the top and bottom edges of the opening 27.

In the operation of the invention, a weight 16, approximately corresponding to the desired weight of the egg to be selected, is suspended from the outer end of the beam, as shown in Fig. 1. An egg is then placed in the basket. If the beam is rocked by the weight of the egg in opposition to the weight to position the weightened end of the beam against the upper edge of the opening 27, it will be indicated that the egg is of sufficient weight to come within the desired class, but in event the egg does not rock the beam, it will be indicated that the egg is of a less weight than that required of a particular class and should be packed with the lesser class. For example, assume eggs weighing seventeen ounces to twenty-one ounces to the dozen as classified as pullets eggs. In grading eggs of this class a weight designated as twenty-one ounce, but in fact weighing 1.75 ounces, will be employed and if this weight is not lifted by the egg it will weigh less than twenty-one ounces to the dozen and be classified as a pullets egg. Standard eggs usually range from twenty-one ounces to twenty-six ounces to the dozen. If the egg lifts the beam, it will be known to weigh over twenty-one ounces to the dozen, and in event movement of the beam is violent it may be judged to exceed twenty-six ounces to the dozen, which can be determined by substituting a weight, designated as a twenty-six ounce, and weighing 2.175, for the twenty-one ounce. Should the egg weigh twenty-six ounces or over to the dozen, it would be classed as "select". In like manner eggs may be graded to any desired weight and within any desired range of weights, as occasion may require.

In the grading of eggs, it is not supposed that every egg will be placed on the grader, for when a person becomes accustomed to grading eggs he will judge a larger portion of the eggs as being of sufficient weight for the particular grade. Hence it is only the egg that the packer questions or is in doubt of being of sufficient weight to go in the particular grade, that is placed on the grader.

I claim:

1. An egg grader, comprising a balanced beam formed of sheet metal, having down-turned side flanges and a perforated down-turned end flange, a pair of standards, a wire secured to said beam and projecting through the side flanges thereof and through perforations in the standards forming a pivotal mounting for the beam, said beam formed with a perforation adjacent its end opposite the perforated end flange adapted to receive an egg, and an egg supporting basket depending beneath said perforation.

2. An egg grader comprising a balanced beam formed of sheet metal and having down-turned side flanges, a pair of standards, pivots connecting the beam to the standards; there being an opening in one end of the beam adapted to receive a single egg; a pair of U-shaped wires secured to the beam below and around the opening and forming a basket for supporting the single egg, and a weight attached to the other end of the beam and adapted to overbalance an egg in the basket below the grade desired.

3. An egg grader comprising a balanced beam, a pair of standards, means pivotally connecting the beam to the standards, a threaded rod mounted under the beam and extending both ways from the center, an adjusting weight screw-threaded upon the rod, a receptacle at one end of the beam adapted to receive and support a single egg, and a counterbalancing weight at the other end of the beam adapted to overbalance an egg below the grade desired.

In testimony whereof I have signed my name to this specification.

OLIVER C. WHITE.

Copies of this patent may be obtained for five cents each, by addressing the "Commissioner of Patents, Washington, D. C."